(12) United States Patent
French et al.

(10) Patent No.: US 7,571,877 B2
(45) Date of Patent: Aug. 11, 2009

(54) OPERATION MECHANISM FOR ACTIVATING A DECELERATION DEVICE

(75) Inventors: Clive French, Woodthorpe Nottingham (GB); Nick Chignell-Stapleton, Sittensen (DE)

(73) Assignee: Airbus Deutschland GmbH (DE)

( * ) Notice: Subject to any disclaimer, the term of this patent is extended or adjusted under 35 U.S.C. 154(b) by 261 days.

(21) Appl. No.: 11/715,840

(22) Filed: Mar. 8, 2007

(65) Prior Publication Data
US 2008/0054123 A1    Mar. 6, 2008

Related U.S. Application Data

(60) Provisional application No. 60/780,337, filed on Mar. 8, 2006.

(30) Foreign Application Priority Data

Mar. 8, 2006   (EP)   ................... 06004710

(51) Int. Cl.
*B64D 1/14*   (2006.01)
(52) U.S. Cl. ............................. 244/129.5; 16/61; 16/79; 242/381
(58) Field of Classification Search ............. 244/129.5, 244/129.4, 118.3; 16/61, 79, 83, 85, 84, 16/54, 286; 242/375, 375.3, 379.1, 381, 242/382.4, 396
See application file for complete search history.

(56) References Cited

U.S. PATENT DOCUMENTS

| | | | |
|---|---|---|---|
| 2,659,573 A | 11/1953 | Smith | |
| 3,020,580 A * | 2/1962 | Glenn | 16/61 |
| 3,182,935 A | 5/1965 | Wischhoefer | |
| 3,480,227 A * | 11/1969 | Matthews | 242/381 |
| 4,230,352 A | 10/1980 | Sealey et al. | |
| 5,782,511 A | 7/1998 | Schwarz et al. | |
| 6,866,226 B2 * | 3/2005 | Pratt et al. | 244/129.4 |
| 2003/0122036 A1 * | 7/2003 | Artsiely | 244/129.4 |
| 2004/0094670 A1 | 5/2004 | Pratt et al. | |
| 2005/0082433 A1 | 4/2005 | Saku et al. | |

FOREIGN PATENT DOCUMENTS

| | | |
|---|---|---|
| DE | 516 627 | 1/1931 |
| FR | 2 002 658 | 10/1969 |
| GB | 1 186 157 | 4/1970 |

* cited by examiner

*Primary Examiner*—Lynda Jasmin
*Assistant Examiner*—Bryan C Clayton
(74) *Attorney, Agent, or Firm*—Lerner, David, Littenberg, Krumholz & Mentlik, LLP

(57) ABSTRACT

An operation mechanism adapted for activating a deceleration device for decelerating an opening movement of a door. The operation mechanism features a first mode of operation and an second operation mode. In the first mode of operation the operation mechanism allows free rotation of the door, when the operation mechanism is loaded by an impulse of the door below a predetermined threshold value. In the second mode of operation when the operation mechanism is loaded by an impulse of the door above the predetermined threshold value the operation mechanism decelerates free rotation of the door by connecting the door to the deceleration device which will then decelerate the acceleration of the door.

22 Claims, 10 Drawing Sheets 8.1    8.2

OPERATION MECHANISM FOR ACTIVATING A DECELERATION DEVICE

CROSS-REFERENCE TO RELATED APPLICATIONS

This application claims the benefit of the filing date of U.S. Provisional Patent Application No. 60/780,337 filed Mar. 8, 2006, the disclosure of which is hereby incorporated herein by reference.

BACKGROUND OF THE INVENTION

The present invention relates to safety systems aboard an aircraft. In particular, the invention relates to an operation mechanism adapted for activating a deceleration device for decelerating an opening movement of a door in the event of a cockpit decompression. Moreover, the invention relates to a cockpit door arrangement comprising such an operation mechanism and to a use of such an operation mechanism aboard an aircraft.

The cockpit door aboard an aircraft provides the primary means of dissipating pressure from the cabin to the cockpit during a cockpit decompression case. A cockpit decompression case may occur as a minimal opening involving relatively slow bleed of pressure up to a maximum opening (as defined by aviation authorities) involving a rapid loss of pressure. To ensure that the delta pressure build up upon the monuments and structure that form the physical barrier between the cabin and cockpit does not exceed the structural limitations, the cockpit door must release and open to a specific venting area within a short time frame. Delay of the door to provide adequate venting may result in catastrophic structural failure.

The total time frame for the door to provide an effective venting area may be defined as the time [ms] for releasing the door lock and the time [ms] for rotating the door open, for example to an opening angle of more than 80°.

To satisfy certain certification requirements defined by aviation authorities, it has to be demonstrated that an aircraft can survive a decompression case without subsequent loss of essential structure/equipment and life. For example, JAR 25.365(e) (2) specifies that the aircraft structure must be able to withstand the depressurization caused by an instant opening of a predetermined area in the pressurized shell, at any operating altitude.

From the beginning of a cockpit decompression event to the point of door lock release delta air pressure is acting upon the door, as time from the decompression event increases, so the delta air pressure load upon the door increases. The delta air pressure load causes the door to rotate open and accelerate, imparting kinetic energy into the door. In this connection, the resultant kinetic energy is dependant upon the air pressure load over time and the moment of inertia (MOI) of the door. This means that the slower the door is unlocked the higher the delta air pressure load at the point of release and that the higher the MOI of the door the longer the duration of (high) air pressure upon the door. Both factors increase the final kinetic energy of the door. Thus cockpit doors that are compliant with the post 9/11 security rules have a high kinetic energy due to the reinforced construction of the door.

Therefore, the cockpit doors should unlock rapidly and rotate through to a minimum venting area (for example more than 80°) as quickly as possible in the event of a cockpit decompression.

Once the door has rotated open sufficient to provide effective venting it must be decelerated, wherefore the energy present in the door must be dissipated without the door detaching (from its hinges) and without damage to the airframe. In particular, since a seat may be installed in the path of the rotating door, it must be ensured that no injuries will be caused to a flight crew member on that seat. Otherwise, without an effective means of energy dissipation, the door, once it has passed 90 degrees, will collide with the seat causing potential injury to occupant and possible detachment of the seat and/or detach the door from its hinges, causing unacceptable structural/equipment damage and possible crew injury.

The energy present in the door must be absorbed without adversely affecting the cockpit wall pressure difference. Allowing the door to rotate open unhindered to the minimum free venting area would advantageously limit the pressure difference load upon the cockpit wall. However the distance to decelerate the door before impact with the adjacent seat is minimal and amounts to approximately 13° of rotation in A 380 aircraft only. In this case, the resultant equivalent static reaction load applied at the centre of area of the door would be in excess of 4500 daN (4.500 kg), whereby the door as well as the adjacent seat might be damaged.

SUMMARY OF THE INVENTION

Amongst other things, it may be an object of the present invention to provide a realization for controlling and reducing the end energy of a cockpit door.

Amongst other things, this object may be met by an operation mechanism which is adapted for activating a deceleration device for decelerating an opening movement of a door, which operating mechanism comprises a pivot lever arrangement inter alia. Besides the pivot lever arrangement, the operation mechanism comprises a pivot arm arrangement which is located in the track of travel of the door and which is coupled to the pivot lever arrangement. In addition to these pivot arm and pivot lever arrangements, the operation mechanism of the present invention comprises a damping arrangement, which is adapted to block rotation of the pivot lever arrangement. Finally, the operation mechanism comprises first and second engagement means, wherein the first engagement means may be attached to a belt of the deceleration device and wherein the first engagement means may be concealed by the pivot arm arrangement and detachably mounted thereon. The second engagement means is located at an edge portion of the door and is designed to engage with the first engagement means. For example, the first engagement means may be designed as a buckle comprising an opening, which may engage with a hook of the second engagement means. Naturally, in contrast thereto, the hook may be located at the first engagement means whereas the second engagement means may be provided with an opening being adapted to engage with the hook on the first engagement means.

Since the operation mechanism of the present invention must be adapted to be used in the event of a cockpit decompression as well as during normal flight conditions, the operation mechanism features a first mode of operation and a second mode of operation, wherein the first mode of operation takes place during normal conditions whereas the second mode of operation takes place during the event of a cockpit decompression. During the first mode of operation, the damping arrangement is adapted to allow rotation of the pivot lever arrangement, when the pivot lever arrangement is loaded by an impact due to a first opening impulse below a predetermined threshold value, which is imparted by the door edge during an opening movement of the door.

In contrast thereto, during the second mode of operation, the damping arrangement is configured to block a rotation of the pivot lever arrangement when being loaded by an impact due to a second opening impulse above the predetermined threshold value, which may be delivered from the door edge to the pivot lever arrangement via the pivot arm arrangement. Due to the first impulse delivered from the door edge to the pivot arm arrangement in the first mode of operation, the pivot arm arrangement rotates together with the pivot lever arrangement without relative movement between these two lever arrangements. Hence, during the first mode of operation, the pivot lever arrangement and the pivot arm arrangement make up a unique assembly, which is rotated as a whole when the impulse delivered from the door edge is below the predetermined threshold value in the first mode of operation.

However, in the second mode of operation when the second impulse delivered from the door edge to the pivot arm arrangement is above the predetermined threshold value, the pivot arm arrangement at least partially uncouples from the pivot lever arrangement thereby exposing the first engagement means. As the second engagement means is located at the same path of travel of the door as the engagement means, the second engagement means will engage with the first engagement means when advancing the first engagement means by further movement of the door, whereby the first engagement means will be detached from the pivot arm arrangement at which it was originally attached in a positive manner by means of a ball catch for example. Hence, by still further movement of the door, the belt of the deceleration device will be withdrawn from its spool wheel thereby breaking the acceleration of the door.

In other words, the present invention provides an operation mechanism, which is adapted for activating a deceleration device for decelerating an opening movement of the cockpit door, wherein the operation mechanism features a first mode of operation and a second mode of operation. In this connection, the first operation mode is characterized in that it allows free rotation of the cockpit door, when the operation mechanism is loaded by an impulse of the door below a predetermined threshold value. In contrast thereto, the second mode of operation is characterized in that the operation mechanism in the second mode of operation decelerates free rotations of the door by connecting the door to the deceleration device, when the operation mechanism is loaded by an impulse of the door above the predetermined threshold value.

Hence, by decelerating free rotation of the door by connecting the door to the deceleration device, the present invention provides an effective means of reducing the end energy of the cockpit door since the free kinetic energy of the door may be abolished by the deceleration device.

As will become apparent from the previous remarks, the functioning of the operation mechanism of the present invention depends on the impulse energy delivered from the door edge via the pivot arm arrangement and the pivot lever arrangement to the damping arrangement. When the impulse energy is below a predetermined threshold value, the operation mechanism will be operated in the first mode of operation whereas the second mode of operation will take place when the impulse energy is above the predetermined threshold value. For example, seen from a static angle, the operation mechanism will be operated in the first mode of operation when a static force below 8 daN is applied to the door edge. However, under decompression conditions, the force acting on the door edge may mount to almost 700 daN wherefore the second mode of operation will take place. Hence, talking in terms of static forces the lever should move without the dampers locking in the first mode of operation with an applied load of 8 daN (and a little more for comfort), whereas the transition between normal movement in the first mode of operation and the locking in the second mode of operation should occur at e.g. 10 times normal load. Hence under static conditions the critical force may amount to about 80 daN, for example.

As will become apparent from the above illustrations, since the first engagement means will be engaged with the second engagement means, the deceleration device coupled with the operation mechanism will be activated which will dissipate the kinetic energy of the moving door in the second mode of operation during an event of cockpit decompression. Since the deceleration device will dissipate most of the kinetic energy, the end energy of the door at a venting area of 80° or more will be reduced, wherefore the risk of structural or equipment damage or injury to the crew will be avoided or at least be reduced.

According to another exemplary embodiment of the present invention, the pivot arm arrangement may be hinged to the pivot lever arrangement comparable to a balance arm, wherein one end of the balance arm is positively connected to the pivot lever arrangement by a ball catch arrangement, for example. Hence, in the first mode of operation, a relative movement between the pivot arm arrangement and the pivot lever arrangement is blocked by a positive locking between these two lever arrangements. In the second mode of operation, when the impulse energy delivered to the pivot arm arrangement is high enough to compensate that positive locking, the pivot arm arrangement carries out a relative movement with respect to the pivot lever arrangement.

Although it was illustrated that the pivot arm arrangement in form of a balance arm may be hinged to the pivot lever arrangement being positively locked to the pivot lever arrangement, it may also be possible to positively connect the pivot arm arrangement completely to the pivot lever arrangement without any hinge. In this case, in the second mode of operation when the impulse energy exceeds the predetermined threshold value, the pivot lever arrangement will be completely detached by the advancing door edge, wherein the positive connection between the pivot arm arrangement and the pivot lever arrangement will be compensated.

According to a further exemplary embodiment of the present invention, the pivot lever arrangement and the pivot arm arrangement make up a C-shaped configuration, which clasps the door edge of the door in the first mode of operation in a closed door position. In this respect, the pivot arm arrangement in plan view forms a first flange of the C-shaped configuration whereas the pivot lever arrangement in plan view forms the remainder of the C-shaped configuration in form of an L-shaped configuration, i.e. the pivot arm arrangement completes the L-shape to a C-shape. Since the pivot arm arrangement and the pivot lever arrangement rotate without any relative movement in the first mode of operation, the C-shaped configuration will rotate as a whole from a closed position to an open position, thereby allowing the door edge to escape from the clasp of the C-shaped configuration. Hence, when the door is in its closed position, the door edge will be clasped by the C-shaped configuration, whereas this clasping engagement will be released in the first mode of operation due to the rotation of the door and the rotation of the C-shaped configuration resulting from the rotary movement of the door.

Since it might be desirable to clasp the door edge again during a closing movement of the door, it is necessary to hold the C-shaped configuration in its open position, as long as the door is open. Therefore, the operation mechanism additionally comprises a spring arrangement, which is adapted to bias the pivot lever arrangement into the closed position or into the open position respectively. To this effect, the spring arrangement is configured to switch between said two biasing modes during rotation of the C-shaped configuration from the closed position to the open position and vice versa, wherefore the spring arrangement is hinged to the pivot lever arrangement in order to snap over a dead centre during movement of the pivot lever arrangement. Due to the switching between said two biasing modes, the spring arrangement will not continuously press the C-shaped configuration in its open position, which would be undesirable, since in this case, even in the closed position of the door, the spring arrangement would try to bias the door open.

Although the spring arrangement is adapted to hold the C-shaped configuration in its open and closed position respectively, the locking achieved thereby is only elastic. However, to attain a locking with respect to the C-shaped configuration which is adapted to withstand an accidental movement of the C-shaped configuration, the operation mechanism may additionally comprise a pawl lever arrangement which is configured to lock the pivot lever arrangement in the open position and which is adapted to be unlocked by the door edge during a closing movement of the door. To this effect, the pawl lever arrangement may comprise at least one pawl lever arranged in the track of travel of the door, so that, during a closing movement of the door the pawl lever arrangement is operated by the door thereby unlocking the pawl lever arrangement.

In order to generate a blocking force to withstand the impulse energy imparted to the operation mechanism, the damping arrangement may comprise a dashpot damper in the form of a hydraulic piston cylinder unit for example, which goes into a momentary hydraulic lock, when the second impulse delivered from the door edge is above the predetermined threshold value.

Since it may desirable that the operation mechanism is not visible from the outside, the operation mechanism may be designed to be partially housed within a doorpost next to the door edge. However, in order to activate the operation mechanism, the doorpost comprises at least two openings through which the pivot arm arrangement and the pivot lever arrangement project into the door's track of travel respectively.

To allow a smooth sliding movement of the door edge with respect to the pivot arm arrangement, the operation mechanism may further comprise a fitting, which is mountable to the door edge and which comprises a roller arrangement, which is adapted to contact and roll along the pivot lever arrangement during the opening movement of the door.

In the preceding paragraphs, the operation mechanism was illustrated as comprising several arrangements, in particular a pivot lever arrangement, a pivot arm arrangement, a pawl lever arrangement, a damping arrangement and a roller arrangement. These arrangements may be made up of two corresponding assemblies respectively which are vertically offset to each other. For example, the pivot lever arrangement may comprise two pivot levers, which are spaced vertically apart from each other. The pivot arm arrangement may comprise two pivot arms, which are vertically offset to each other. The same applies to the pawl lever arrangement, the damping arrangement and the roller arrangement respectively which are redundantly designed consisting of two pairs of arrangement components being vertically offset to each other. The redundant provision of components may make it possible that the operation mechanism will still work although one component is out of order.

According to another exemplary embodiment of the invention, the operation mechanism comprises a deceleration device which is adapted for gradually dissipating the kinetic energy of a swiveling door, for example, in the event of a cockpit decompression. Inter alia, the deceleration device comprises a spool wheel which is designed to carry a belt which is wound up on the spool reel. The belt of the spool reel is adapted to be automatically connected to the cockpit door in the event of a cockpit decompression in order to absorb some of the kinetic energy of the cockpit door. The deceleration device moreover comprises an elevating spindle which is adapted to be driven by said spool reel in the event that the belt is being retracted from the spool reel. The deceleration device includes at least one collet which is screwed to the elevating spindle so that the collet may move in a longitudinal direction of the elevating spindle due to a rotation of the spool reel. For purposes of dissipating kinetic energy, the deceleration device includes at least one spring assembly which is installed between the collet and a fixed bearing portion of the deceleration device. Hence, the at least one collet will be screwed towards the fixed bearing portion by retraction of the belt from the spool reel whereby the spring assembly will be compressed, so that a reaction load is generated by the spring assembly counteracting the retraction of the belt.

Therefore, by means of the deceleration device it is possible to decelerate the acceleration of a cockpit door in the event of a cockpit decompression by generating a reacting force which counteracts the movement of the door.

According to another exemplary embodiment of the present invention, the spring assembly comprises a plurality of compression springs which are situated between the collet and the spring bearing portion thereby surrounding the elevating spindle. The provision of a plurality of compression springs may be useful since in the event that a single spring should break down, the deceleration device will remain operative. For example, the plurality of compression springs may coaxially surround the elevating spindle. As an alternative, the plurality of compression springs may be disposed in regular intervals around the elevating spindle.

According to a further embodiment of the invention, the collet may be shaped in the form of a polygon in plan view which comprises a plurality of rounded edges which form receptacles for the plurality of compression springs which are disposed at regular intervals around the elevating spindle.

To avoid a rotation of the collet due to rotation of the elevating spindle, the deceleration device may further comprise at least one cup-shaped housing comprising a cam profile which matches the polygonal shape of the collet to allow the collet to slide into the housing and to avoid rotation of the collet. In this embodiment, the fixed bearing portion mentioned above forms part of the base of the housing, so that the plurality of compression springs is situated between the base of the cup-shaped housing and the collet. Instead of providing a cup-shaped housing for purposes of guiding the collet in the longitudinal direction of the elevating spindle, it may be possible to provide other guiding means for guiding the collet in longitudinal direction of the elevating spin thereby exclusively avoiding a rotation of the collet with respect to the bearing portion.

According to another exemplary embodiment, the elevating spindle comprises a bearing shaft which is rotatably mounted in the fixed bearing portion and a threaded shaft sleeve surrounding the bearing shaft. In this embodiment, the bearing shaft, the bearing sleeve and the spool reel surrounding the elevating spindle are connected to each other by means of a single shear pin. The connection of these three elements by means of a single shear pin may be useful, since in case that the total travel of the collet along the elevating spindle should be exploited, further rotation of the spool reel will not damage the elevating spindle as a whole. Rather, the shear pin will be sheared off whereby it is possible that only the shaft sleeve will be damaged and the bearing shaft will remain intact.

Moreover, the provision of a single shear pin may be useful since in case that the total travel of the collet along the elevating spindle should be exploited, further kinetic energy will be dissipated by shearing the shear pin.

To provide a further means for dissipating kinetic energy in the event that the total travel of the collet along the elevating shaft should be exploited, the deceleration device may further comprise at least one energy-absorbing tube surrounding the elevating spindle which is arranged to come prior into contact with the fixed bearing portion than the at least one collet to dissipate further energy by deformation of the at least one energy absorbing tube. For example, the energy absorbing tube may be connected to the collet surrounding the elevating spindle.

According to yet another exemplary embodiment, the deceleration device may comprise a plurality of wave spring washers, which have a negligible spring constant. In this connection, the plurality of spring washers is connected in series with the plurality of compression springs, so that during an initial rotation of the spool reel no reaction load will be generated due to the negligible spring constant of the plurality of spring washers.

The provision of the spring washers may be useful since it may be advantageous to allow the door to open and initially accelerate as quickly as possible during a first opening angle so that in case of a cockpit decompression the pressure load across the door will not adversely increase.

According to a final exemplary embodiment of the present invention, the whole deceleration device is symmetrically and redundantly designed. In this connection, the deceleration device comprises an elevating spindle which features right-hand and left-hand threads at either side of a central portion which is surrounded by the spool reel. Due to a retraction force, the spool reel screws a first collet toward a first fixed bearing portion, thereby compressing a first spring assembly situated between the first collet and the first fixed bearing portion. In comparison, due to the retraction force, the spool reel screws a second collet toward a second fixed bearing portion, thereby compressing a second spring assembly situated between the first collet and the first fixed bearing portion.

According to a yet another exemplary embodiment of the present invention, a cockpit door arrangement for use in an aircraft is provided which comprises a cockpit door as well as an operation mechanism as is illustrated in the preceding paragraphs and which is arranged for activating a deceleration device for decelerating an opening movement of the cockpit door in the event of a cockpit decompression.

Finally, it is suggested to use an operation mechanism as illustrated in the preceding paragraphs aboard an aircraft, which is arranged for activating a deceleration device for decelerating an opening movement of a cockpit door in the event of a cockpit decompression.

BRIEF DESCRIPTION OF THE DRAWINGS

In the following, the present invention will be illustrated with reference to the drawings enclosed herewith.

In the drawings.

In the following description of the figures, the same reference characters are used for identical or similar elements.

DETAILED DESCRIPTION

Figure 1:
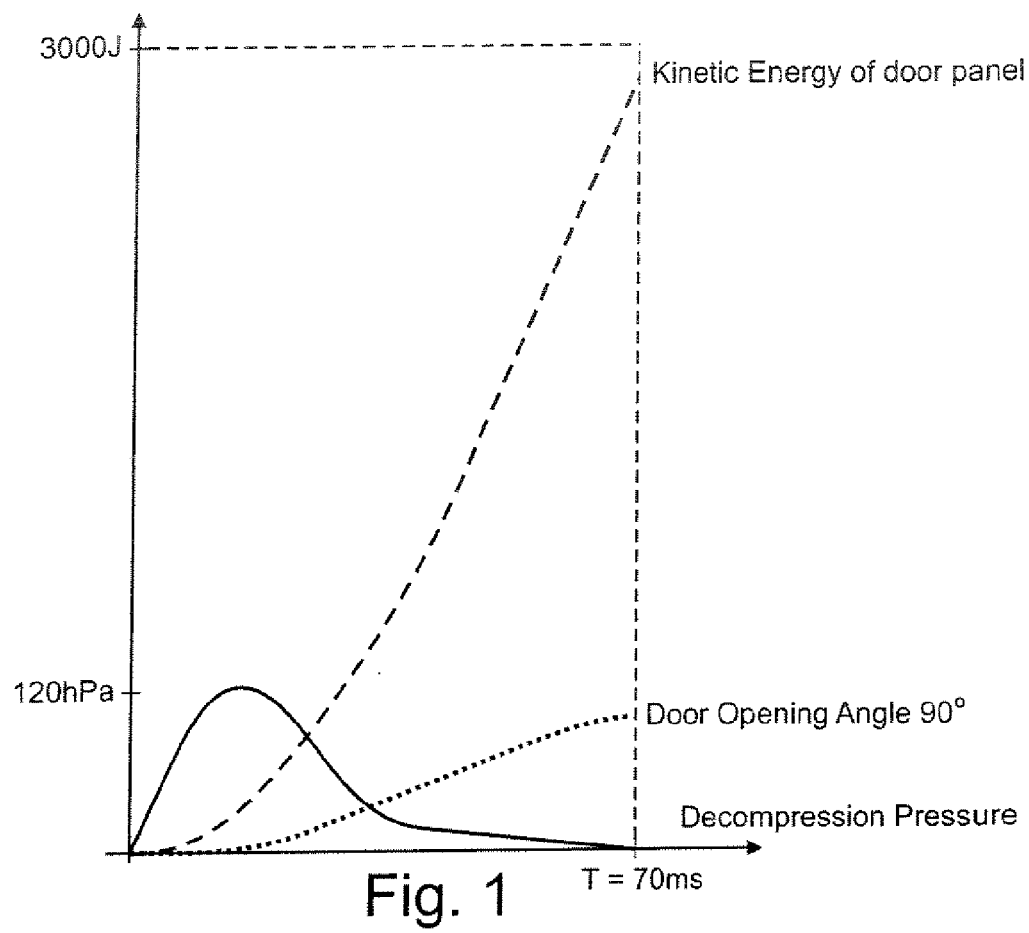
FIG. 1 shows a diagram illustrating pressure versus energy over door angle.

The following paragraphs detail the operation mechanism 1, which is mounted in the doorpost 26 next to the door edge 4 of the cockpit door 3. The doorpost 26 is covered by a sprung loaded protective sheath 25 to provide effective means with respect to external demolitions. The operation mechanism 1 employs a deceleration device 2 comprising a rated belt 19, which is similar in material and construction to a seat or cargo harness. The deceleration device 2 is dormant in the first mode of operation of the operation mechanism 1 and is activated by the high forces generated in a decompression to attach the belt 19 to the door 3 via a buckle 20 and a catch arrangement in form of a hook 21.

In normal use, the operation mechanism 1 is rotated open and close with the movement of the door 3, without impeding entry or exit.

As will become apparent from FIGS. 2 to 5, the operation mechanism 1 comprises a pivot lever 5 that carries a buckle 20 to which the belt 19 of the deceleration device 2 is positively attached as is shown in FIGS. 10 to 13. Pivot lever 5 is rotatably mounted to swivel around axis 27. A fitting 17 is located on the door edge 4 comprising a roller 18 and a hook 21, which is located in the plane of buckle 20. During the opening movement of the door 3, the roller 18 of fitting 17 will contact the pivot arm 6, rotating it away from the advancing door. Since pivot arm 6 is connected to pivot lever 5, rotation of pivot arm 6 will be transferred to pivot lever 5, which is controlled by dashpot damper 7 and compression spring 12. Hence, in the first mode of operation, pivot lever 5 will turn around axis 27.

Pivot lever 5 will be kept open by use of a pawl lock arrangement 13, 14, 16 which is spring loaded and unlocked by advancement of the door 3 to the closed position, ensuring that the door 3 may be safely closed without being prevented by the pivot lever 5.

In the following, the operation mechanism will be illustrated in detail with reference to the drawings. As will become apparent from FIG. 2, the operation mechanism is substantially completely housed within doorpost 26 next to the door edge 4 of door 3. The operation mechanism 1 comprises at least a pivot lever arrangement of two pivot levers 5, and a pivot arm arrangement of two pivot arms 6, which are vertically offset from each other as will become apparent from FIG. 15. Pivot arm 6 is located in the track of travel of the door edge 4 and is coupled to the pivot lever 5 by hinge pin 10. Moreover, pivot arm 6 is coupled to pivot lever 5 by a ball catch arrangement 11, which will unlock when the impulse energy delivered by door edge 4 exceeds a predetermined threshold value. Pivot lever 5 is rotatably mounted to swivel around axis 27.

Figure 15:
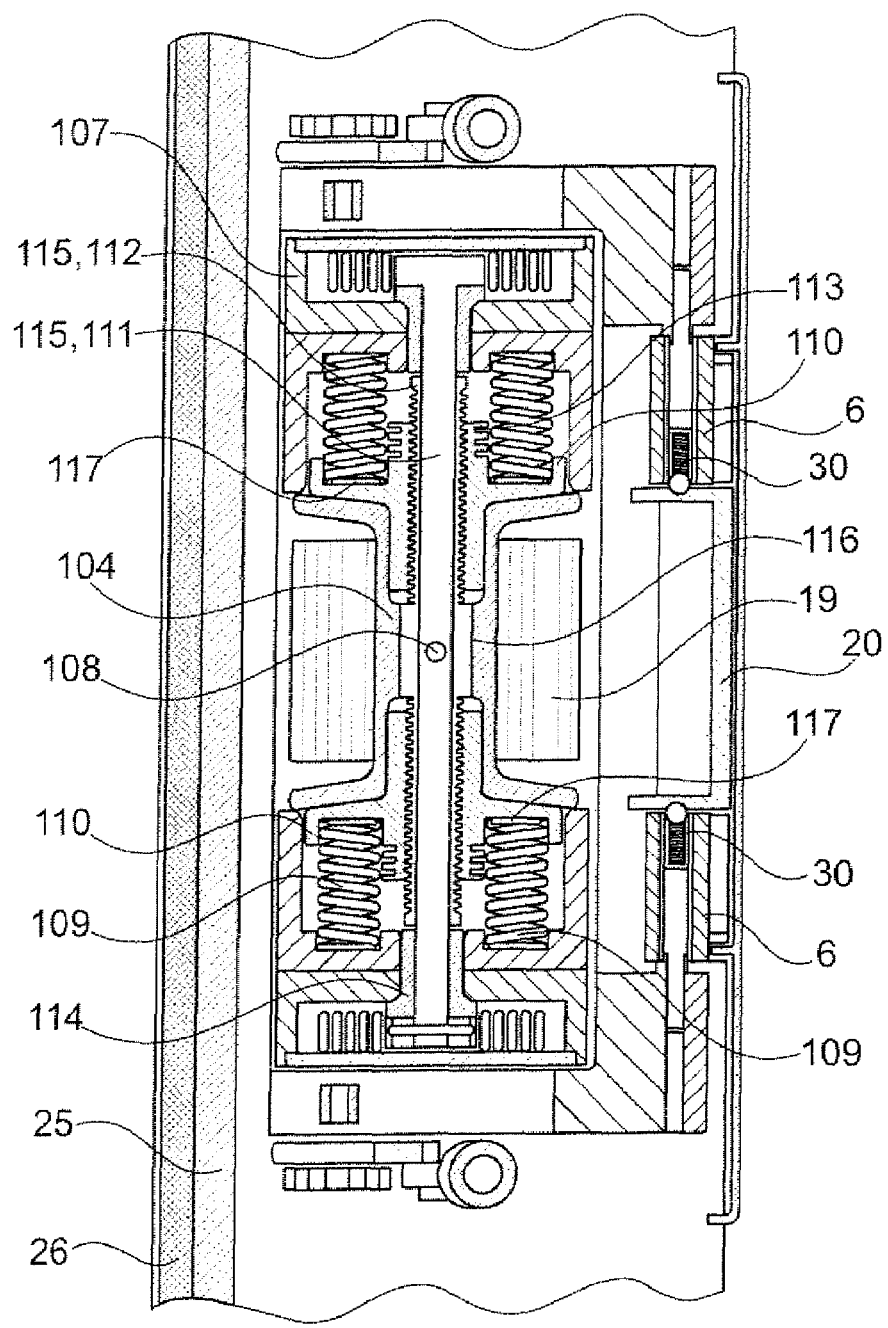
FIG. 15 shows a sectional view through the operation mechanism including the deceleration device along line A-A in FIG. 14

Furthermore, the operation mechanism 1 comprises a damping arrangement comprising two dashpot dampers 7 which are vertically offset as is depicted in FIG. 15. The dashpot damper 7 rests against a post on pivot lever 5 and is connected to a fixed position of the operation mechanism 1.

Figure 2:
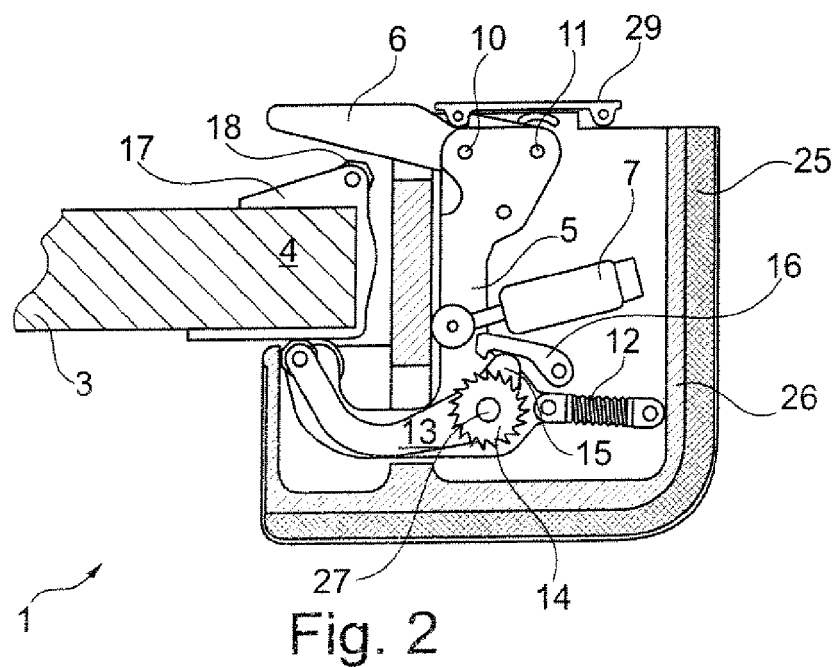
FIG. 2 to 5 show a plan view onto the operation mechanism of the present invention during a door opening movement in the first mode of operation.
Figure 3:
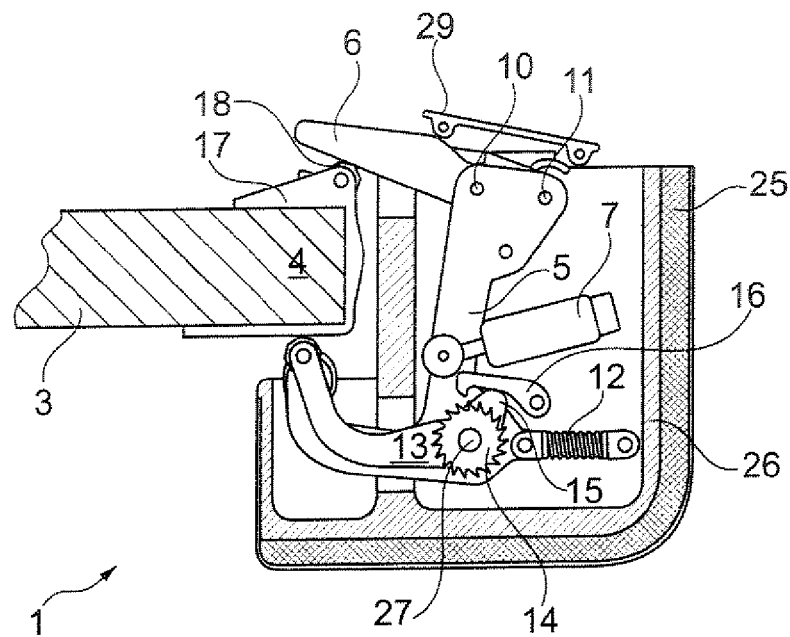

As will become apparent from the drawings, the pivot lever 5 and the pivot arm 6 make up a C-shaped configuration clasping the door edge 4 in the first mode of operation as is depicted for example in FIG. 2. In this respect, the pivot arm 6 forms a flange of the C-shaped configuration and the pivot lever 5 forms the reminder of the C-shaped configuration in form of an L-shaped configuration.

A pawl lever arrangement is located and mounted at the bending region of the L-shaped pivot lever 5 and comprises an arcuate pawl lever 13 rotatably mounted around axis 27 on pivot lever 5. Pawl lever 13 is spring loaded in order to carry out a clockwise rotation. An escape wheel 14 is connected to pivot lever 5 aligned with axis 27 and is adapted to engage with escape wheel lever 16 which is rotatably mounted to a fixed position of the operation mechanism 1. Escape wheel lever 16 is spring loaded in order to carry out a rotation in counter clockwise direction. The pawl lever 13 comprises a cam profile 15, which is adapted to interact with escape wheel lever 16 for purposes of disengaging escape wheel lever 16 from escape wheel 14.

Figure 5:
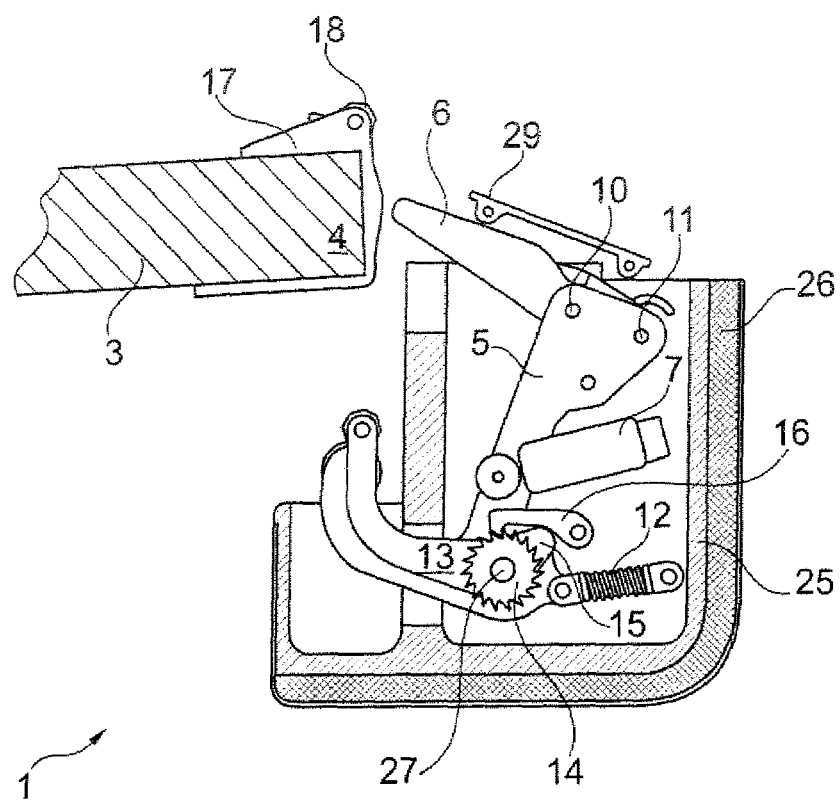

The operation mechanism 1 furthermore comprises a spring arrangement comprising two compression springs 12, wherein each compression spring 12 is hinged at one end to a fixed position of operation mechanism 1. At the other end, the compression spring 12 is connected to the bent region of the L-shaped pivot lever 5, wherein the longitudinal axis of compression spring 12 is not aligned with axis 27. Since pivot lever 5 is rotatably mounted with respect to axis 27, spring 12 is adapted to bias the pivot lever 5 either into the closed position of FIG. 2 or into an open position as is shown in FIG. 5 for example.

As will become apparent from FIG. 2, door 3 is in its closed position, wherein door edge 4 is clasped by the C-shaped configuration of pivot lever 5 and pivot arm 6. As will become apparent from FIG. 3, during an opening movement of door 4, roller 18 contacts pivot arm 5, wherefore the C-shaped configuration of pivot lever 5 and pivot arm 6 is rotated as a whole around axis 27 due to the impulse energy delivered from door edge 4 to pivot arm 6. As will become further apparent from FIG. 3, pawl lever 13 which is spring loaded around axis 27 imparts a force to fitting 17 via pawl lever roller 28, wherefore an opening force is generated to allow easy opening of the door which may amount to about 4 to 8 daN.

Since the impulse energy delivered from the door edge 4 is below a predetermined threshold value, the positive connection 11 between pivot lever 5 and pivot arm 6 is maintained, wherefore the C-shaped configuration of pivot lever 5 and pivot arm 6 rotates as a whole around axis 27. Since the energy imparted into pivot lever 5 is below a predetermined threshold, damper 7 will not go into a momentary hydraulic lock wherefore door 3 can be opened without being blocked by damper 7 in the first mode of operation.

Figure 4:
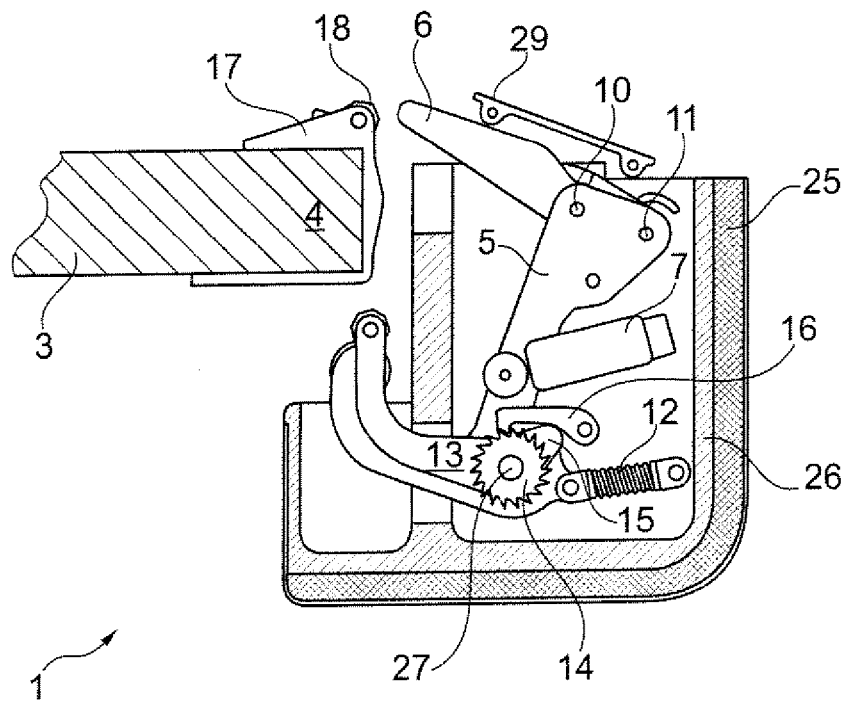

By the further opening movement of door 3 (cf. FIG. 4), pawl lever 13 rotates in clockwise direction around axis 27, wherein cam 15 of pawl lever 13 slides along escape wheel lever 16 wherefore escape wheel lever 16 engages with escape wheel 14, so that the whole operation mechanism 1 will be fixed in the position of FIG. 4.

As will become apparent from the drawings, doorpost 26 is covered by a rotatable cover 29, which is rotated due to the rotary movement of the C-shaped configuration of pivot lever 5 and pivot arm 6.

Figure 6:
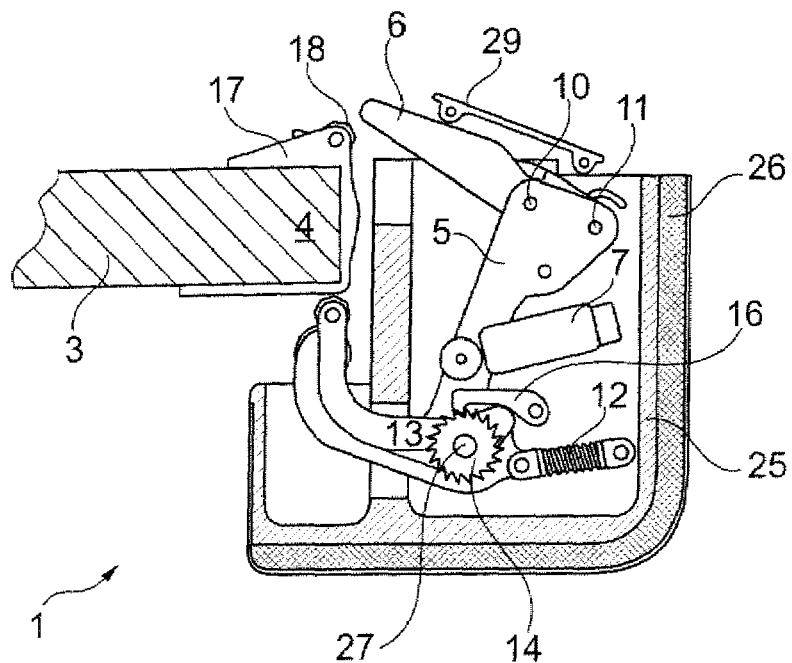
FIGS. 6 and 7 show a plan view onto the operation mechanism of the present invention during a closing movement of the door in the first mode of operation.
Figure 7:
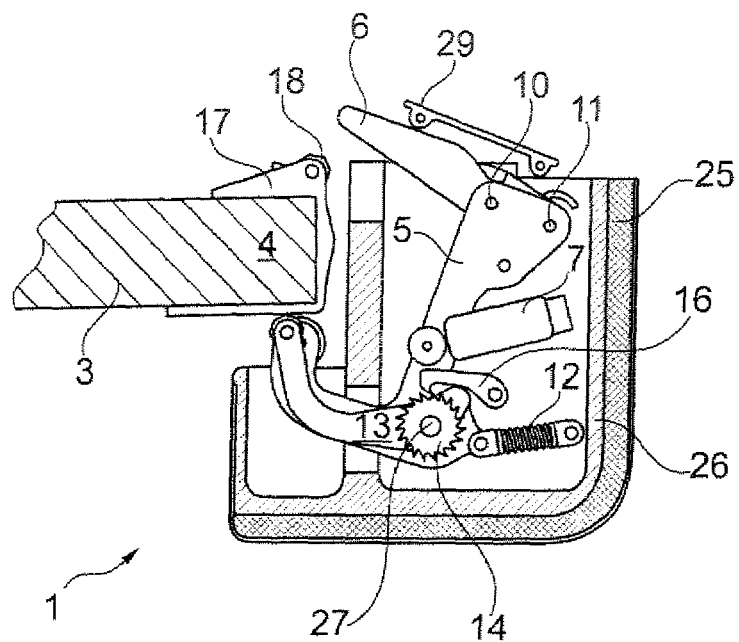

FIGS. 6 and 7 illustrate the disengagement of escape wheel lever 16 from escape wheel 14 during a closing movement of door 3. When door 3 contacts pawl wheel roller 28, pawl lever 28 will be rotated in counter-clockwise direction whereby cam 15 contacts escape wheel lever 16 thereby disengaging the escape wheel lever 16 from the escape wheel 14 so that the lock of the pawl lever arrangement is eliminated. Hence, by further closing movement of door 3, door edge 4 will slide along the free end of pivot lever 5, wherefore the C-shaped configuration will rotate in counter-clockwise direction against the compression force of spring 12 until spring 12 passes its dead centre so that the C-shaped configuration of pivot lever 5 and pivot arm 6 is biased into its closed position as is depicted in FIG. 2.

It should be noted that the motion sequence depicted in FIGS. 2 to 7 illustrate a motion sequence wherein the impulse energy delivered from door edge 4 to pivot arm 6 is below the predetermined threshold value wherefore damper 7 does not go into momentary hydraulic lock.

The PTS (Purchaser Technical Specification) for the cockpit door 3 defines an predeterminable opening force to allow easy opening of the door, to prevent noise to the adjacent flight crew rest compartments and to prevent the door from rotating forward when electrical power is removed so that the door locks are unlocked.

It should be further noted that as the door 3 is opened, the roller 18 of fitting 17 contacts the pivot arm 6 rotating it away from the door 3 and changing the relationship between the pivot lever 5 and the compression spring 12. In the closed position, the pivot lever 6 is held by both the door 3 and the compression spring 12. On opening the door, the relationship changes and the spring 12 adds to rotate pivot lever 5. Both of these actions decrease the force required to rotate the pivot lever 5 and provide a method of rotating the pivot arm 6 away from the tip of the door edge 4 to ensure adequate clearance when closing.

Figure 8:
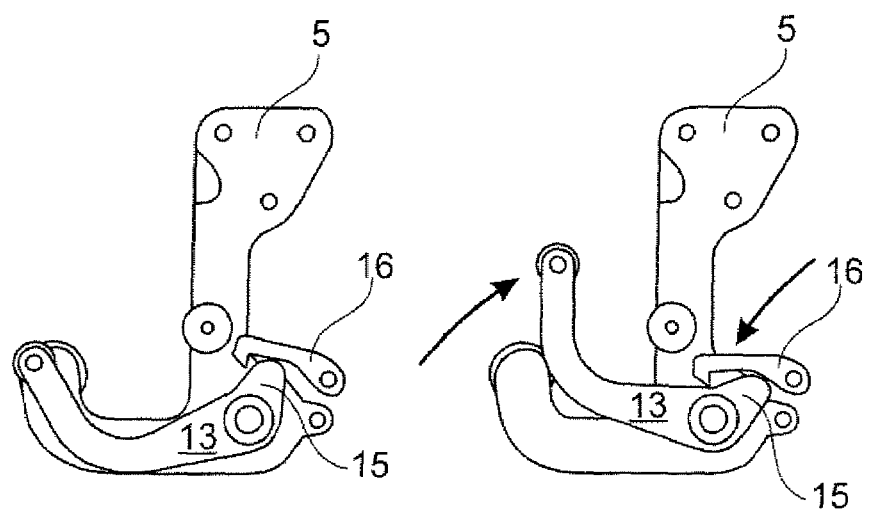
FIG. 8 illustrates the functionality of the pawl lever arrangement.

FIGS. 8.1 and 8.2 again illustrate the motion sequence of the pawl lever arrangement 13, 14, 16. As may be seen from FIG. 8.1 which shows the pawl lever arrangement in its initial state in pawl lever 13 is tensioned against its tension spring operable around its hinge axis 27. In this initial state, the pawl lever arrangement is disengaged since escape wheel lever 16 is disengaged from escape wheel 14 (not shown) by means of cam profile 15 of pawl lever 13. When pawl lever 13 rotates in clockwise direction as is illustrated in FIG. 8.2, escape wheel lever 16 falls into lock with escape wheel 14 (not shown) since cam profile 15 no longer blocks the rotary movement of escape wheel lever 16 which is caused due to a torque generated around the pivot axis of escape wheel lever 16 by means of a torsion spring (not shown).

Figure 9:
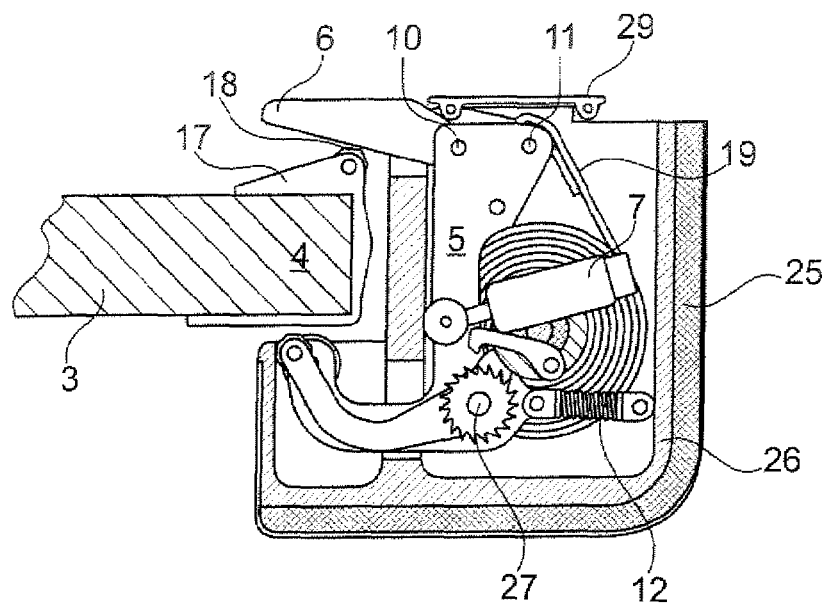
FIG. 9 shows another plan view onto the operation mechanism of the present invention in a closed door position.
Figure 10:
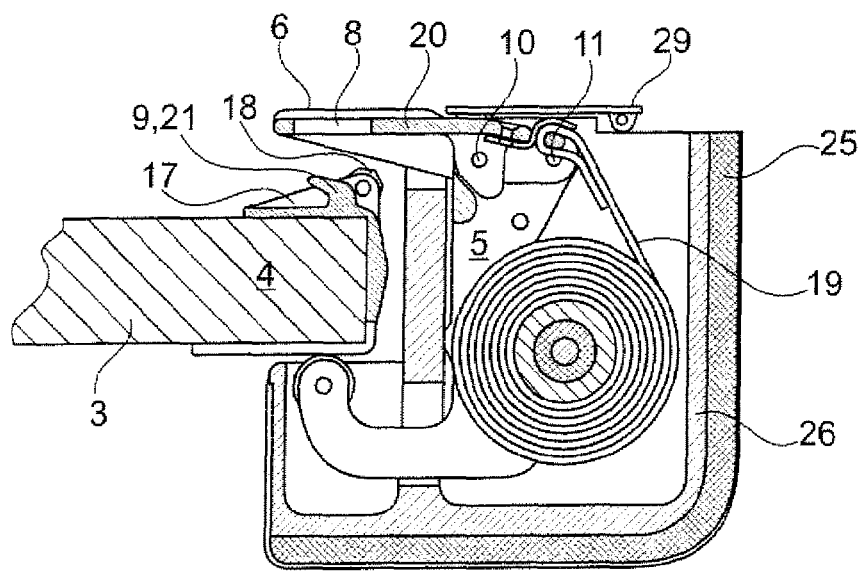
FIG. 10 to 13 show cross-sectional views through the operation mechanism during an opening movement of the door in the second mode of operation.

In the following, the activation of the deceleration device 2 will be illustrated with reference to FIGS. 9 to 13. FIG. 9 differs from FIG. 10 only in that in FIG. 10 the deceleration device 2 as well as the buckle 20 connected to the belt 19 of the deceleration device 2 may be seen more clearly. As will become apparent from FIGS. 9, 10 and in particular FIG. 15, the deceleration device is arranged between the elements of the operation mechanism 1 which are all vertically offset in pairs with respect to each other thereby housing the deceleration device 2. The deceleration device 2 comprises a spring-loaded belt 19 which is connected to a buckle 20 which is concealed by the pivot arm(s) as is depicted in FIG. 10.

Buckle 20 for its part is detachably mounted between the two vertically offset pivot arms 6 by means of two ball catches 30.

Figure 11:
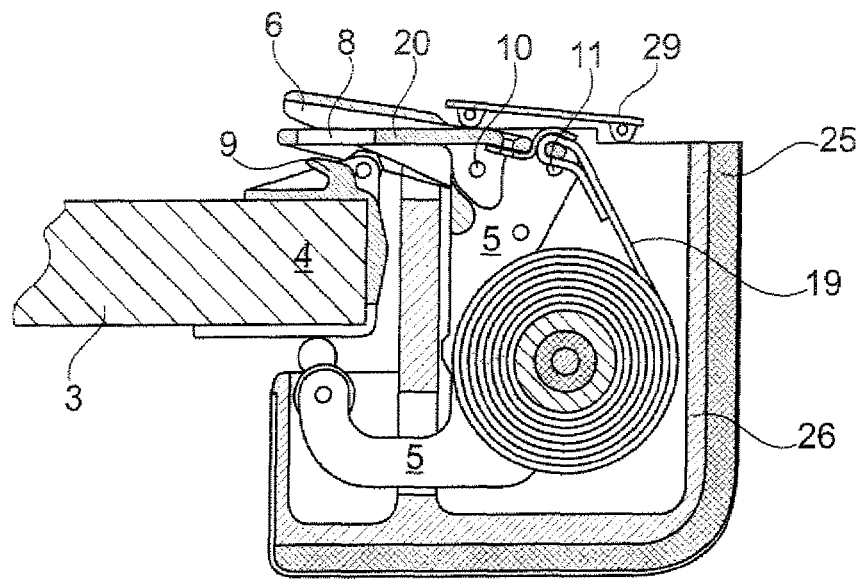
Figure 12:
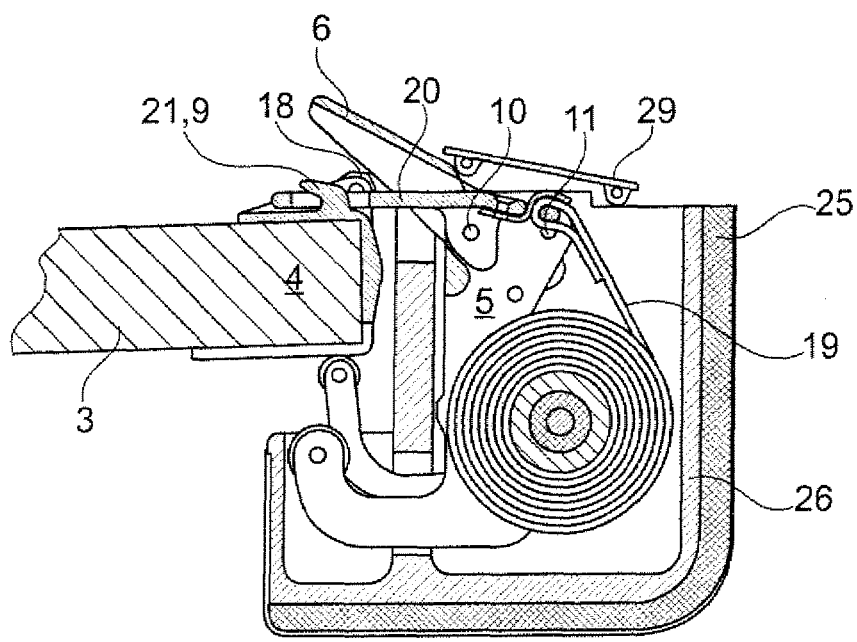

When the impulse energy delivered from door edge 4 to pivot arm 6 is above the predetermined threshold value in the second mode of operation, which is depicted in the motion sequence of FIGS. 10 to 13, pivot lever 5 will not rotate since in the second mode of operation the damping arrangement blocks rotation of the pivot lever 5. Since pivot lever 5 will rest in its initial position when the impulse energy delivered from the door edge 4 to the pivot arm 6 is above the predetermined threshold value, the pivot arm 6 will uncouple from the pivot lever 5 by disengaging the positive fit of ball catch 11 acting between pivot lever 5 and pivot arm 6. Therefore, due to the impulse energy delivered from door edge 4 to pivot arm 6, the pivot arm 6 will rotate about hinge pin 10, thereby exposing the buckle 20 as is illustrated in FIG. 11.

Figure 13:
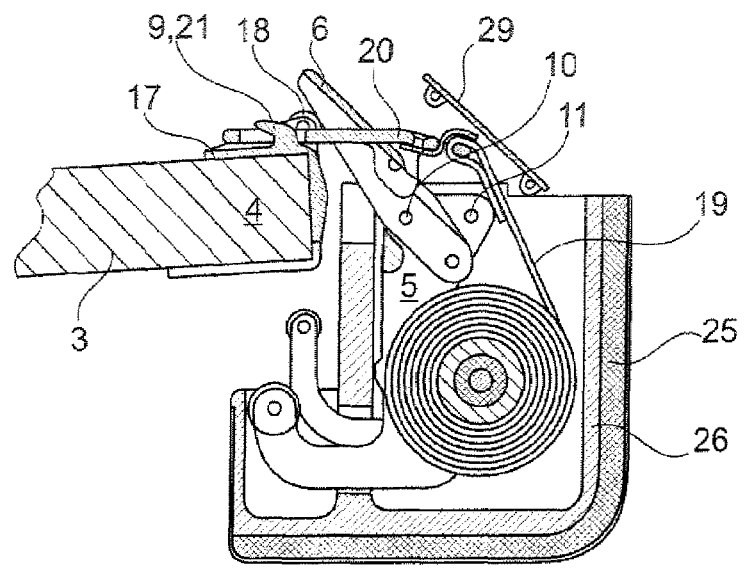
Figure 14:
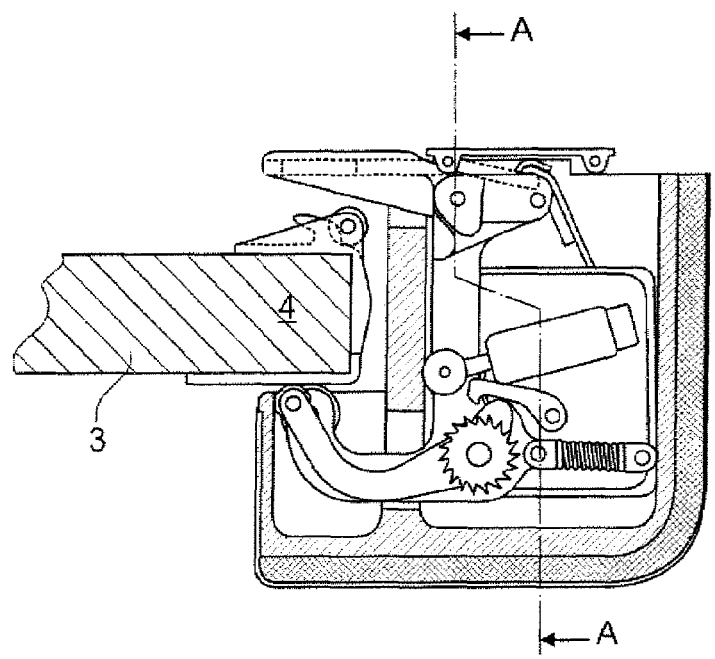
FIG. 14 illustrates the section line to receive FIG. 14.

By further opening movement of the door 3, the advancing hook 21 provided on fitting 17 engages with recess 8 formed in buckle 20 wherefore due to the tension force imparted from hook 21 to the buckle, the buckle will be detached from the pivot arm arrangement 6 by disengaging ball catch 30 acting between pivot arm 6 and buckle 20 as is depicted in FIG. 13. Hence, by further movement of the door 3, the belt 19 of the deceleration device 2 will be withdrawn from its spool wheel thereby breaking the acceleration of the door 3 by generating a reaction load to the door edge 4 due to the spring operated deceleration device 2.

Recapitulating, it shall become apparent that in the second mode of operation the movement of the pivot levers 5 is controlled and in particular blocked by use of the two linear dashpot type dampers 7. These dampers 7 allow movement at relatively low loads but under high forces and rapid movements in case of a decompression are forced into a hydraulic lock and hence block the rotation of the pivot lever 5. In this condition, the pivot arm 6, which is attached and locked to the pivot lever arrangement 5 by two ball catches 11, snaps out of engagement with these ball catches 11 and rotates independently. This action will expose the belt buckle 20 which is cradled by the pivot arm arrangement 6. As the pivot arm arrangement 6 rotates open due to an impulse energy delivered from door edge 4, the buckle 20 by geometrical definition is retained in the door plane and receives the advancing hook 21 of the door fitting 17. Further movement of the door engages the hook 21 into the buckle 20 and begins to withdraw the belt 19 from the spool wheel of the deceleration device 2.

Under rotation the spool wheel breaks the acceleration of the door 3 by reacting a small load through an internal mechanism as is depicted in FIG. 15. Thus, the reaction force is realised.

The following paragraphs detail the deceleration device 2, which is mounted within doorpost 15. As will become apparent from FIG. 2, the deceleration device 2 comprises a housing 7 in which the main components of the device 2 are installed. In particular, an elevating spindle 16 extends in a vertical direction and rotates in two bearings 14 which are supported on housing 7. The elevating spindle 16 may consist of two mating parts, a bearing shaft 11 and a shaft sleeve 12 featuring both right hand and left hand threads either side of a short central plain shank 17.

The deceleration device 2 moreover comprises a spool reel 4 which surrounds the plain shank 17 of the elevating spindle 17. A belt 3 is wound up on the spool reel 4 and is connected to a buckle 5 which is positively held in position by means of two ball catches 6. The shaft assembly 11, 12 slides into the spool reel 4 and is locked to the spool reel 4 by means of a single shear pin 8. At either end the shaft is supported by the plain bearings 14 which are in turn supported to the main housing 7.

On each side of the spool reel 4, steel collets 10 screw down the threads of the shaft sleeve 12. The collets 10 may be profile milled to a rounded hexagonal shape and fit within a matching profile of the housing 7. Between collet 10 and housing 7 six compression springs are installed on either side of the plain shank 17 in recessed pockets in both collet and housing, such that they are held in position by the collets 10 and the housing 7.

When the first engagement means 8 of the operation mechanism in the second mode of operation is engaged with the second engagement means 9 of the operation mechanism 1, the belt 3 from the spool reel 4 will be retracted causing the spool reel 4 to rotate. This rotation will be directly transferred (via the shear pin) to the shaft assembly. As each of the collet 10 is captivated by its conforming profile in its respective housing 7, the rotational movement of the spool reel 4 and shaft assembly 11, 12 is transferred to the linear movement of the collets 10. The movement of the collets 10 is outwards from the spool reel 4 in the direction of the housing 7 such that the captivated springs are compressed along their free length. Thus for each 360° of rotation 1.5 mm of linear travel (standard 10.0 mm metric thread=1.5 mm pitch) may be achieved. The collective spring force is set to react to a load such that a predetermined force is required to extract the belt 3 from the spool reel 4. For example, the springs 9 might be designed to have a constant spring rate such that the force remains constant through the angular rotation of the spool 4. However as the belt 19 retracts from the spool 4 the diameter of the belt on spool reel 4 decreases. Hence, each successive rotation requires less length of belt due to the geometry of the belt on the spool reel 4. So by virtue of the belt geometry the reaction force to the door movement may be described as progressive.

The first rotation of the spool reel 4 does not compress the springs 9 but brings both collets 10 into engagement. This is to allow a single free rotation of the spool reel 4 with minimal force. To this effect, a plurality of wave spring washers 18 having a negligible spring constant may be connected in series with the plurality of compression springs 9, so that during an initial rotation of the spool reel 4 no reaction load will be generated due to the negligible spring constant of the plurality of wave spring washers 18. The first complete rotation may be equivalent to the door opening by approximately 10° (belt extracted by 150 mm). This first free movement is intended to allow the door 3 to open and initially to accelerate as quickly as possible so as not to adversely increase the pressure load across the door 3 and is timed to a point where the pressure load peaks and begins to fall whereas the door energy overtakes the peak pressure load and begins to accelerate rapidly (cf. FIG. 1).

Additionally, where maintenance inspection or unit failure or accidental engagement of the belt 3 occurs during normal use, the first free rotation allows the door to open sufficient to allow detachment of the belt from the cabin side. The belt is self retracting by means of a drive spring situated at one end of the shaft assembly. The drive spring is set to retract the belt by one revolution, it is connected to the shaft by means of a sprung loaded gear that will slip freely on the shaft if rotation exceeds one revolution.

The total travel of the collet 10 along the shaft assembly may be 10.5 mm which translates to 7 full turns (760 mm of belt extension). This allows the door to rotate through to its maximum venting area at 80°.

Prior to reaching the end stop a further method of energy absorption may be employed by incorporating an energy absorbing tube 13 into the end of the collets 10 such that the collets 10 contact the housing 7 before the maximum travel of 10.5 mm. Hence, the force which is necessary to collapse the energy absorbing tube 13 is dissipated due to the deformation of the energy absorbing tube 13.

Finally, further kinetic energy may be absorbed from the travelling door 3 at an angle close to its maximum vent area due to the two part design of the elevating spindle 16. The shaft assembly 11, 12 is designed as two parts to allow shearing of the threaded sleeve 12 from the spool reel 4 without affecting the structural integrity of the main support bearing shaft 11. Hence, due to the relative movement of threaded sleeve 12 from the spool reel 4 shearing the single shear pin 9, further kinetic energy may be absorbed.

The intention is to absorb the maximum energy from the travelling door throughout its rotation from 10° onwards, without adversely increasing the pressure load, whilst limiting the maximum reaction load.

Figure 16:
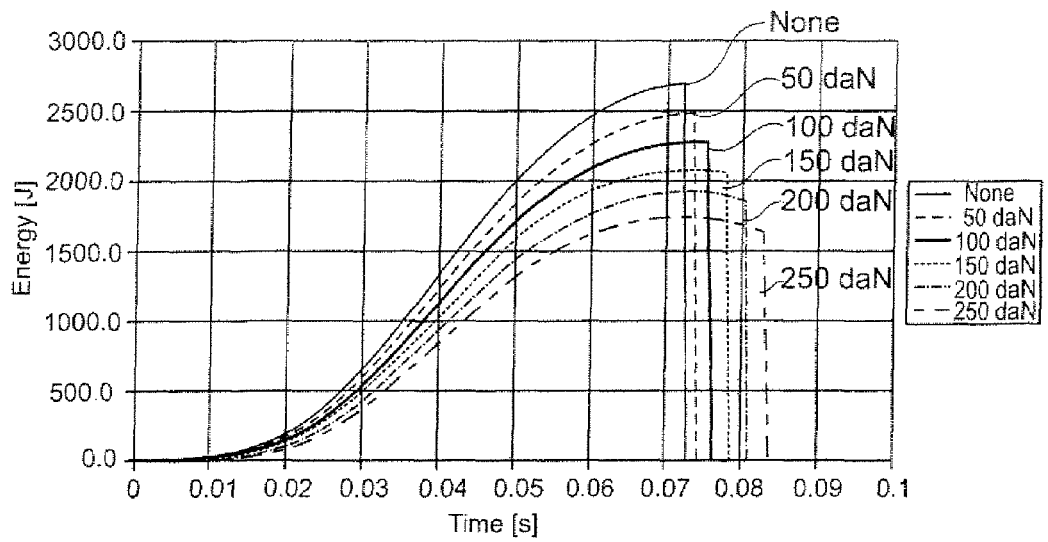
FIG. 16 shows a diagram illustrating the effect of the deceleration device with respect to the door energy.

In the following, the effect of the operation mechanism on the door will be illustrated. It can be seen from the following graph of FIG. 16 that reacting a force (normal to door plane) at the door centre of area by means of the deceleration device 2 throughout the doors rotation under decompression load will reduce the end energy. In particular:

Reacting a load of 50 daN at the door centre of area will reduce the end energy by 8% (2684 J to 2473 J).

Reacting a load of 100 daN at the door centre of area will reduce the end energy by 16% (2684 J to 2263 J).

Reacting a load of 150 daN at the door centre of area will reduce the end energy by 24% (2684 J to 2054 J).

Reacting a load of 200 daN at the door centre of area will reduce the end energy by 32% (2684 J to 1840 J).

Reacting a load of 250 daN at the door centre of area will reduce the end energy by 40% (2684 J to 1630 J).

Figure 17:
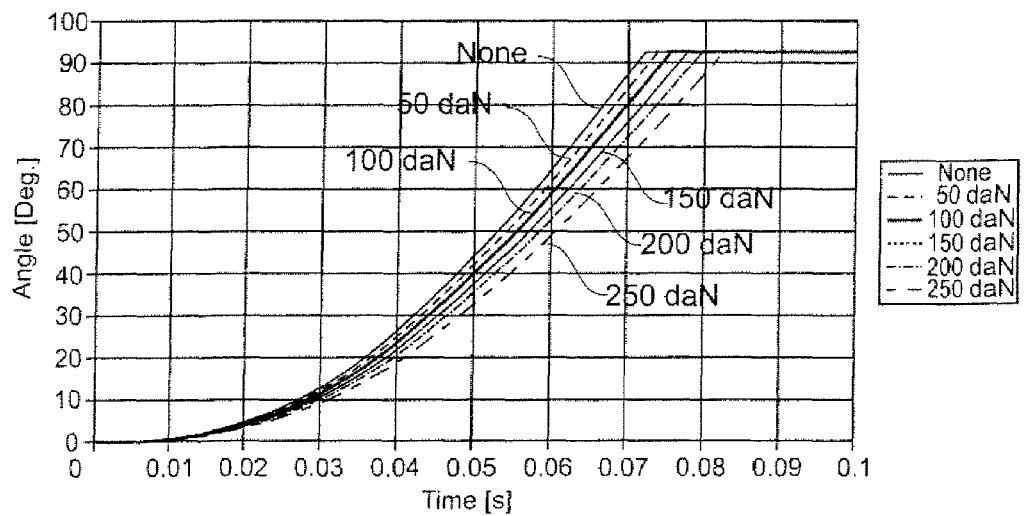
FIG. 17 shows a diagram illustrating the effect of the deceleration device with respect to the door opening time.

Assuming a series of reaction loads as described in the foregoing paragraph, the effect of door opening time is shown in FIG. 17. As will become apparent from FIG. 17, Reacting a load of 50 daN at the door centre of area increases the time taken to reach the minimum venting area (80°) by 3% (0.067 ms to 0.069 ms);

Reacting a load of 100 daN at the door centre of area increases the time taken to reach the minimum venting area (80°) by 4.5% (0.067 ms to 0.070 ms);

Reacting a load of 150 daN at the door centre of area increases the time taken to reach the minimum venting area (80°) by 7.5% (0.067 ms to 0.072 ms);

Reacting a load of 200 daN at the door centre of area increases the time taken to reach the minimum venting area (80°) by 10.5% (0.067 ms to 0.074 ms);

Reacting a load of 250 daN at the door centre of area increases the time taken to reach the minimum venting area (80°) by 13% (0.067 ms to 0.076 ms).

Figure 18:
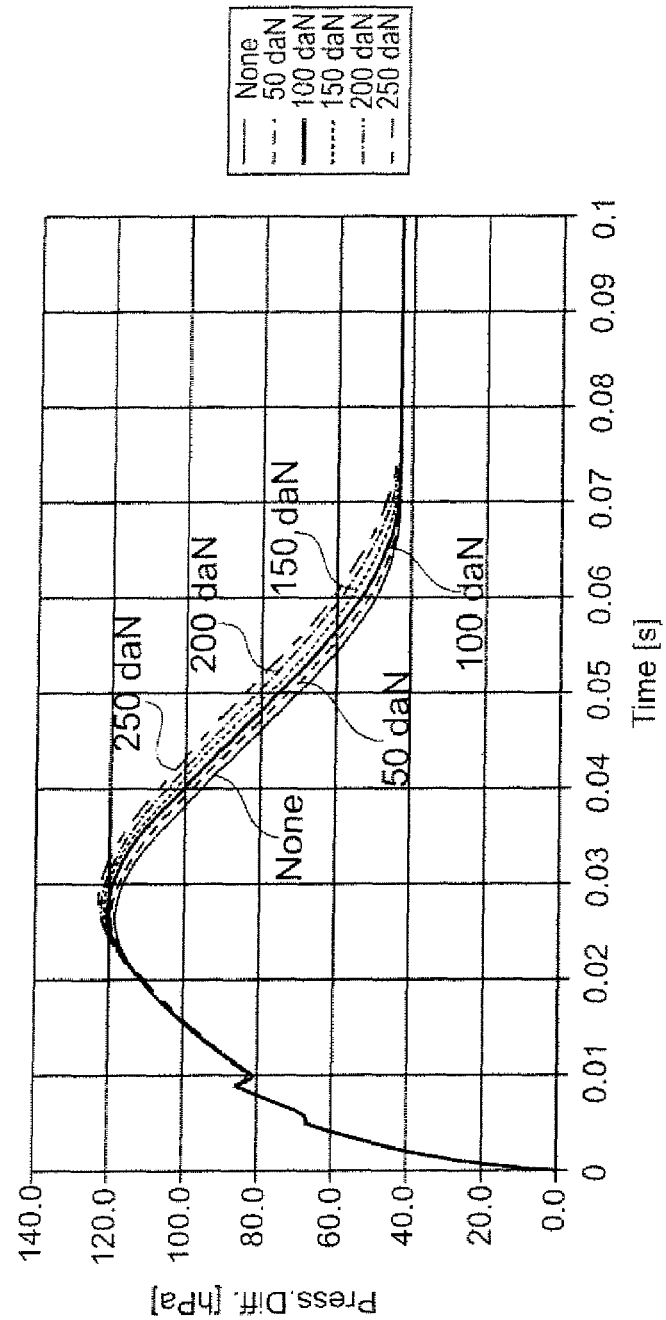
FIG. 18 shows a diagram illustrating the effect of the deceleration device with respect to the differential pressure.

Assuming a series of reaction loads as described above, the effect on the cockpit wall pressure difference is shown in FIG. 18, which shows that Reacting a load of 50 daN at the door centre of area increases the differential pressure by 0.67% (119 hPa to 119.8 hPa);

Reacting a load of 100 daN at the door centre of area increases the differential pressure by 1.26% (119 hPa to 120.5 hPa);

Reacting a load of 150 daN at the door centre of area increases the differential pressure by 1.85% (119 hPa to 121.2 hPa);

Reacting a load of 200 daN at the door centre of area increases the differential pressure by 2.5% (119 hPa to 122.0 hPa);

Reacting a load of 250 daN at the door centre of area increases the differential pressure by 3.2% (119 hPa to 122.8 hPa).

Hence, reacting a load equivalent to 250 daN at the door Centre of Area reduces the end energy by over 1000 Joules (40%) but increases the cockpit wall differential pressure by just 3.8 hPa (3.2%). Thus a method for controlling and reducing the end energy of the door without substantially increasing the pressure load upon the monuments can be realised by means of the present operation mechanism.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

| REFERENCE LIST | |
| --- | --- |
| 1 | operation mechanism |
| 2 | deceleration device |
| 3 | door |
| 4 | door edge |
| 5 | pivot lever |
| 6 | pivot arm |
| 7 | damping arrangement |
| 8 | first engagement means |
| 9 | second engagement means |
| 10 | hinge pin |
| 11 | ball catch |
| 12 | compression spring |
| 13 | pawl lever |
| 14 | escape wheel |
| 15 | cam |
| 16 | escape wheel lever |
| 17 | fitting |
| 18 | roller |
| 19 | belt |
| 20 | buckle |
| 21 | hook |
| 22 | recess |
| 25 | protective sheath |
| 26 | doorpost |
| 27 | axis of 5 and 13 |
| 28 | pawl lever roller |
| 29 | cover |
| 30 | ball catch (buckle) |
| 104 | spool reel |
| 107 | housing |
| 108 | shear pin |
| 109 | spring |
| 110 | collet |
| 111 | bearing shaft |
| 112 | Shaft sleeve |
| 113 | energy absorbing tube |
| 114 | bearing |
| 115 | elevating spindle |
| 116 | plain shank |
| 117 | wave spring washer |

The invention claimed is:

1. An operation mechanism adapted for activating a deceleration device for decelerating an opening movement of a door, the operation mechanism comprising:
   a pivot lever arrangement;
   a pivot arm arrangement being located in the door's track of travel and coupled to the pivot lever arrangement;
   a damping arrangement being adapted to block rotation of the pivot lever arrangement;
   a first engagement means attached to a belt of the deceleration device and said belt being concealed by the pivot arm arrangement and detachably mounted thereon; and
   a second engagement means located at an edge portion of the door and designed to engage with the first engagement means;
   wherein the operation mechanism features a first mode of operation and an second operation mode;
   wherein the damping arrangement allows rotation of the pivot lever arrangement in the first mode of operation when being loaded by an impact due to a first opening impulse below a predetermined threshold value delivered from the door edge, whereas in the second mode of operation the damping arrangement blocks rotation of the pivot lever arrangement when being loaded by an impact due to a second opening impulse above the predetermined threshold value delivered from the door edge;
   wherein due to the first impulse delivered from the door edge to the pivot arm arrangement in the first mode of operation, the pivot arm arrangement rotates together with the pivot lever arrangement without relative movement between both lever arrangements; and
   wherein due to the second impulse delivered from the door edge to the pivot arm arrangement in the second mode of operation, the pivot arm arrangement at least partially uncouples from the pivot lever arrangement thereby exposing the first engagement means, wherefore by further movement of the door the advancing second engagement means will engage with the first engagement means detaching said first engagement means from the pivot arm arrangement, so that by further movement of the door the belt of the deceleration device will be withdrawn from said deceleration device spool reel, thus breaking the acceleration of the door.

2. The operation mechanism according to claim 1, wherein the pivot arm arrangement is hinged to the pivot lever arrangement, wherein in the first mode of operation relative movement between both lever arrangements is blocked by a positive locking, and wherein in the second mode of operation said positive locking is compensated due to the second impulse delivered from the door edge to the pivot arm arrangement so that the pivot arm arrangement carries out a relative movement with respect to the pivot lever arrangement.

3. The operation mechanism according to claim 1, wherein the pivot lever arrangement and the pivot arm arrangement make up a C-shaped configuration clasping the door edge of the door in the first mode of operation in a closed door position, wherein the pivot arm arrangement forms a first flange of the C-shaped configuration and the pivot lever arrangement forms the remainder of the C-shaped configuration in form of an L-shaped configuration.

4. The operation mechanism according to claim 3, wherein due to an opening movement of the door from the closed position to an open position generating the first impulse in the first mode of operation, the C-shaped configuration as a whole is rotated, thereby allowing the door edge to escape from the clasp of the C-shaped configuration.

5. The operation mechanism according to claim 4, further comprising:
   a pawl lever arrangement being configured to lock the pivot lever arrangement in the open position, and being adapted to be unlocked by the door edge during a closing movement of the door.

6. The operation mechanism according to claim 5, wherein the pawl lever arrangement comprises at least one pawl lever arranged in the door's track of travel, so that, during a closing movement of the door, the pawl lever arrangement is operated by the door edge thereby unlocking the pawl lever.

7. The operation mechanism according to claim 3, further comprising:
   a spring arrangement being adapted to bias the pivot lever arrangement either into the closed position or into the open position,
   wherein the spring arrangement is configured to switch between said two biasing modes during rotation of the C-shaped configuration from the closed position to the open position and vice versa.

8. The operation mechanism according to claim 3, wherein during a closing movement of the door the door edge engages into the clasp of the C-shaped configuration thereby biasing the C-shaped configuration into its closed position completely clasping the door edge.

9. The operation mechanism according to claim 1, wherein the damping arrangement comprises at least one dashpot damper, which goes into a momentary hydraulic lock, when the second impulse delivered from the door edge is above the predetermined threshold value.

10. The operation mechanism according to claim 1, wherein the operation mechanism is at least partially housed within a door post next to the door edge, which door post comprises at least two openings through which the pivot arm arrangement and the pivot lever arrangement project into the door's track of travel.

11. The operation mechanism according to claim 1, further comprising:
    a fitting mountable to the door edge and comprising a roller arrangement, which is adapted to contact and roll along the pivot arm arrangement during the opening movement of the door.

12. The operation mechanism according to claim 1, wherein the at least one arrangement selected from the group of arrangements consisting of pivot lever arrangement, pivot arm arrangement, pawl lever arrangement, damping arrangement and roller arrangement is redundantly designed consisting of two pairs of arrangement components, which are vertically spaced apart.

13. The operation mechanism according to claim 1, further comprising:
    a deceleration device adapted for gradual dissipation of kinetic energy, including:
    spool reel carrying the belt being wound up on the spool reel;
    an elevating spindle being driven by the spool reel when the belt is being retracted from the spool reel;
    at least one collet screwed to the elevating spindle; and
    at least one spring assembly being installed between the collet and a fixed bearing portion of the deceleration device;
    wherein the at least one collet is screwed towards the fixed bearing portion by retraction of the belt from the spool reel thereby compressing the spring assembly, whereby a reaction load is generated by the spring assembly counteracting the retraction of the belt.

14. The operation mechanism according to claim 13, wherein the spring assembly comprises a plurality of compression springs being situated between the collet and the fixed bearing portion and surrounding the elevating spindle.

15. The operation mechanism according to claim 14, the deceleration device further comprising:
a plurality of wave spring washers having a negligible spring constant,
wherein the plurality of spring washers is connected in series with the plurality of compression springs, so that during an initial rotation of the spool reel no reaction load will be generated due to the negligible spring constant of the plurality of wave spring washers.

16. The operation mechanism according to claim 13, wherein the collet is shaped in the form of a polygon in plan view having a plurality of rounded edges forming receptacles for the plurality of compression springs.

17. The operation mechanism according to claim 13, the deceleration device further comprising:
at least one cup-shaped housing comprising a profile matching the polygonal shape of the collet to allow the collet to slide into the housing,
wherein the fixed bearing portion forms part of the base of the housing, so that the plurality of compression springs being situated between the base and the collet.

18. The operation mechanism according to claim 13, wherein the elevating spindle comprises a bearing shaft being rotatably mounted in the fixed bearing portion and a threaded shaft sleeve surrounding the bearing shaft, wherein the bearing shaft, the shaft sleeve and the spool reel surrounding the elevating spindle are locked to each other by means of a single shear pin.

19. The operation mechanism according to claim 13, the deceleration device further comprising:
at least one energy absorbing tube surrounding the elevating spindle to come prior into contact with the fixed bearing portion than the at least one collet, to dissipate further energy by deformation of the at least one energy absorbing tube.

20. The operation mechanism of claim 13, wherein the deceleration device is symmetrically designed comprising an elevating spindle featuring right hand and left hand threads at either side of a central portion being surrounded by the spool reel, which due to a retraction force screws a first collet towards a first fixed bearing portion thereby compressing a first spring assembly situated between the first collet and the first fixed bearing and screws a second collet towards a second fixed bearing portion thereby compressing a second spring assembly situated between the first collet and the first fixed bearing portion.

21. A cockpit door arrangement in an aircraft, comprising:
a cockpit door; and
an operation mechanism comprising:
a pivot lever arrangement;
a pivot arm arrangement being located in the door's track of travel and coupled to the pivot lever arrangement;
a damping arrangement being adapted to block rotation of the pivot lever arrangement;
a first engagement means attached to a belt of the deceleration device and said belt being concealed by the pivot arm arrangement and detachably mounted thereon; and
a second engagement means located at an edge portion of the door and designed to engage with the first engagement means;
wherein the operation mechanism features a first mode of operation and an second operation mode;
wherein the damping arrangement allows rotation of the pivot lever arrangement in the first mode of operation when being loaded by an impact due to a first opening impulse below a predetermined threshold value delivered from the door edge, whereas in the second mode of operation the damping arrangement blocks rotation of the pivot lever arrangement when being loaded by an impact due to a second opening impulse above the predetermined threshold value delivered from the door edge;
wherein due to the first impulse delivered from the door edge to the pivot arm arrangement in the first mode of operation, the pivot arm arrangement rotates together with the pivot lever arrangement without relative movement between both lever arrangements; and
wherein due to the second impulse delivered from the door edge to the pivot arm arrangement in the second mode of operation, the pivot arm arrangement at least partially uncouples from the pivot lever arrangement thereby exposing the first engagement means, wherefore by further movement of the door the advancing second engagement means will engage with the first engagement means detaching said first engagement means from the pivot arm arrangement, so that by further movement of the door the belt of the deceleration device will be withdrawn from said deceleration device spool reel, thus breaking the acceleration of the door,
wherein the operation mechanism is arranged for activating a deceleration device for decelerating an opening movement of the cockpit door in the event of a cockpit decompression.

22. A method for activating a deceleration device for decelerating an opening movement of a cockpit door in the event of a cockpit decompression, comprising:
providing an operation mechanism comprising:
a pivot lever arrangement;
a pivot arm arrangement being located in the door's track of travel and coupled to the pivot lever arrangement;
a damping arrangement being adapted to block rotation of the pivot lever arrangement;
a first engagement means attached to a belt of the deceleration device and said belt being concealed by the pivot arm arrangement and detachably mounted thereon; and
a second engagement means located at an edge portion of the door and designed to engage with the first engagement means;
wherein the operation mechanism features a first mode of operation and an second operation mode;
rotating the pivot lever arrangement in the first mode of operation when being loaded by an impact due to a first opening impulse below a predetermined threshold value delivered from the door edge, whereas in the second mode of operation the damping arrangement blocks rotation of the pivot lever arrangement when being loaded by an impact due to a second opening impulse above the predetermined threshold value delivered from the door edge;
wherein due to the first impulse delivered from the door edge to the pivot arm arrangement in the first mode of operation, the pivot arm arrangement rotates together with the pivot lever arrangement without relative movement between both lever arrangements; and wherein due to the second impulse delivered from the door edge to the pivot arm arrangement in the second mode of operation, the pivot arm arrangement at least partially uncouples from the pivot lever arrangement thereby exposing the first engagement means, wherefore by further movement of the door the advancing second engagement means will engage with the first engagement means detaching said first engagement means from the pivot arm arrangement, so that by further movement of the door the belt of the deceleration device will be withdrawn from said deceleration device spool reel, thus breaking the acceleration of the door.

* * * * *